(12) United States Patent
Fortin

(10) Patent No.: US 7,108,246 B2
(45) Date of Patent: Sep. 19, 2006

(54) WINCH FOR CARGO TIE-DOWN STRAPS

(76) Inventor: Jacques Fortin, 503 Principale, St-Edmond, QC (CA)

( * ) Notice: Subject to any disclaimer, the term of this patent is extended or adjusted under 35 U.S.C. 154(b) by 90 days.

(21) Appl. No.: 10/698,202

(22) Filed: Nov. 3, 2003

(65) Prior Publication Data

US 2004/0155230 A1    Aug. 12, 2004

Related U.S. Application Data

(60) Provisional application No. 60/446,078, filed on Feb. 10, 2003.

(51) Int. Cl.
*B65H 77/00* (2006.01)
(52) U.S. Cl. .................... 254/222; 24/69 ST
(58) Field of Classification Search ........ 254/222–223, 254/220, 225–226, 241, 245; 24/69 ST, 24/69 CT, 69 TS, 68 CT, 71 ST
See application file for complete search history.

(56) References Cited

U.S. PATENT DOCUMENTS

| | | | | |
|---|---|---|---|---|
| 1,530,844 | A | * | 3/1925 | Mickler ........................ 254/225 |
| 1,762,535 | A | * | 6/1930 | Treat ........................... 254/225 |
| 3,240,473 | A | * | 3/1966 | Coffey et al. ............... 410/103 |
| 3,428,331 | A | | 2/1969 | Morgan et al. |
| 4,234,166 | A | | 11/1980 | Cederblad |
| 4,428,099 | A | | 1/1984 | Richmond |
| 4,566,674 | A | | 1/1986 | Ebey et al. |
| 4,613,273 | A | * | 9/1986 | Wagner ...................... 414/463 |
| 4,823,443 | A | | 4/1989 | Waters |
| 5,490,749 | A | | 2/1996 | Arbues |
| 5,975,455 | A | | 11/1999 | Alegre |
| 6,481,692 | B1 | * | 11/2002 | King ........................... 254/219 |
| 6,705,597 | B1 | * | 3/2004 | Reilly et al. ................. 254/223 |
| 6,729,604 | B1 | * | 5/2004 | Claycomb ................... 254/217 |

* cited by examiner

*Primary Examiner*—Emmanuel M Marcelo

(57) ABSTRACT

A winch for cargo tie-down straps to tie down straps comprising a winch frame having
  a frame securing segment and a pair of integrally extending flanges;
  a winch drum rotatably mounted between said flanges;
  a pawl and ratchet mechanism attached at a longitudinal end of the winch frame;
  a fixed gear extending from an opposed longitudinal end of the winch drum;
  a free gear extending axially from the fixed gear;
  a worm gear mounted within a worm gear frame for driving a driving disc, the driving disc being adapted to selectively engage said fixed and free gears, depending on the positioning of the worm gear frame relative to a worm gear frame mounting assembly extending from the winch frame.

4 Claims, 7 Drawing Sheets

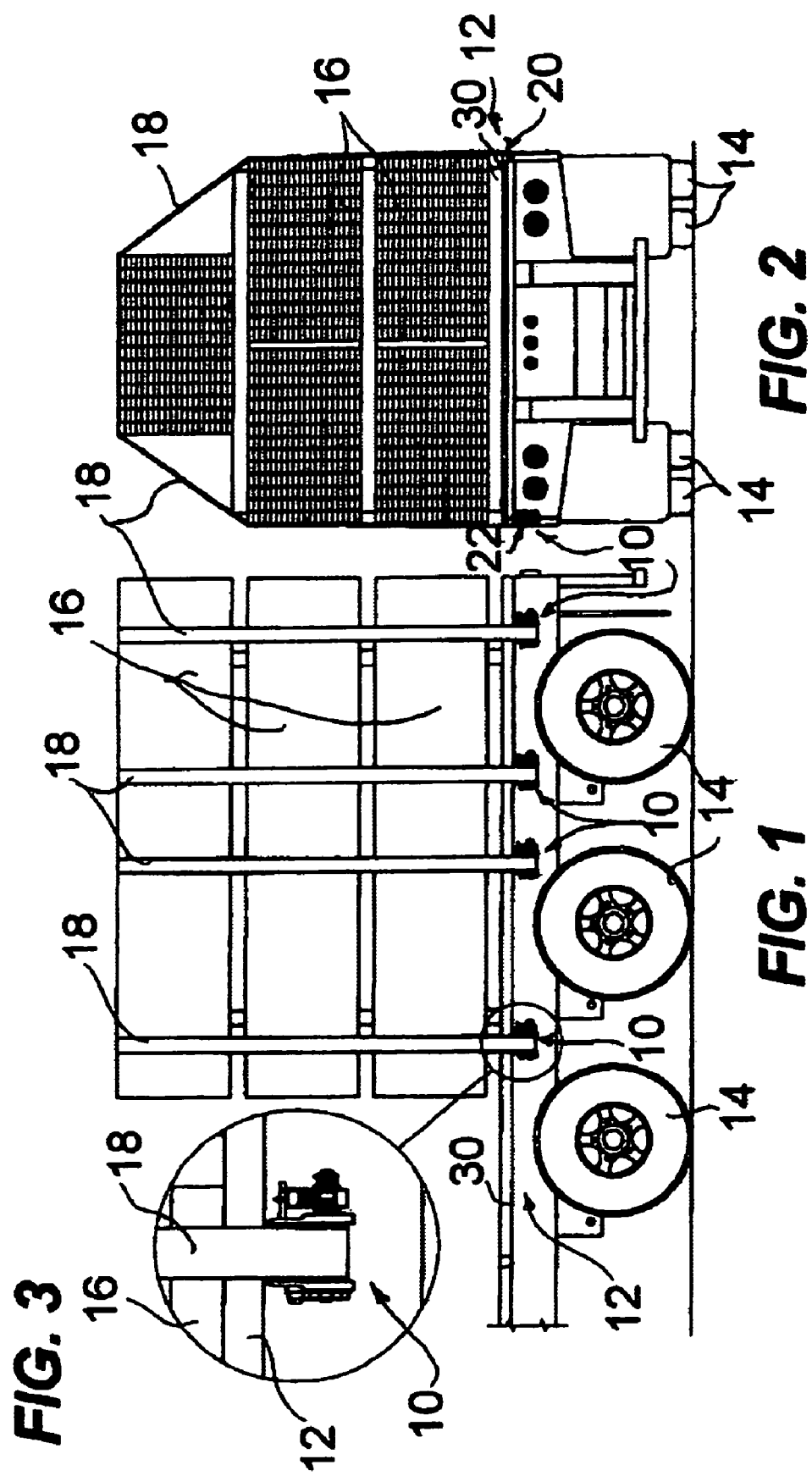

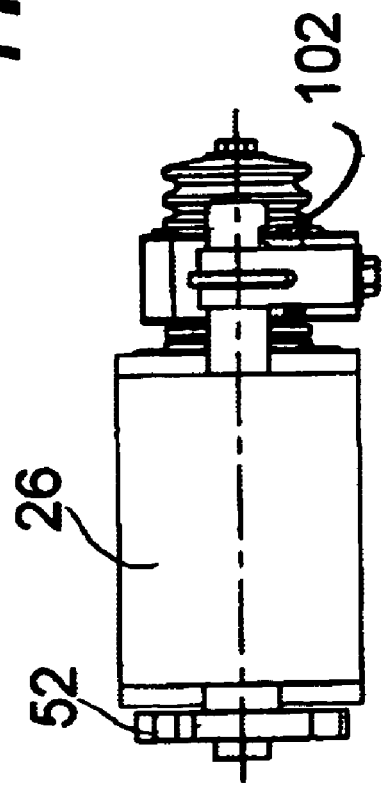
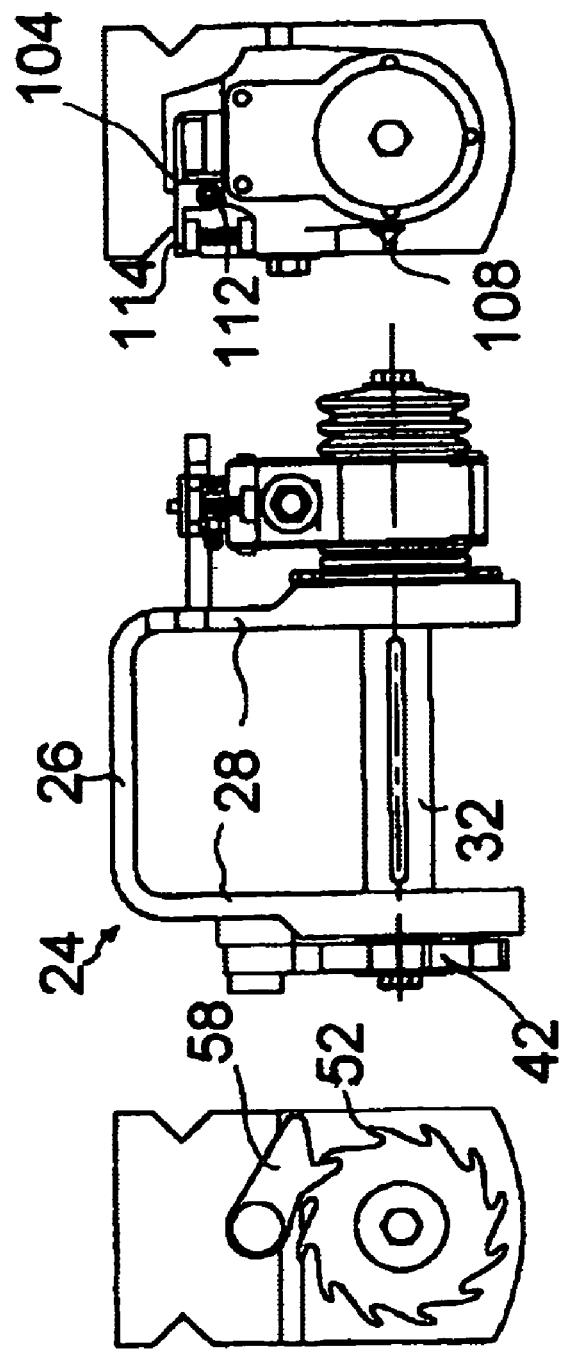

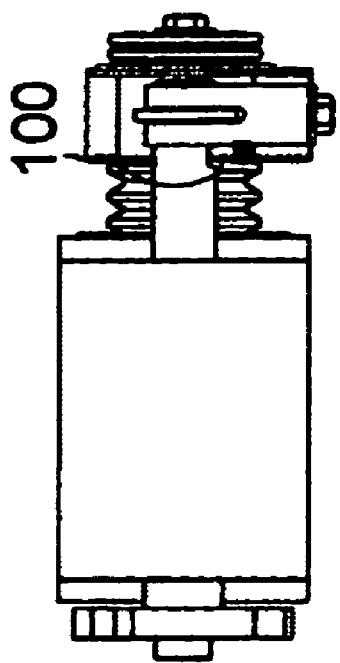
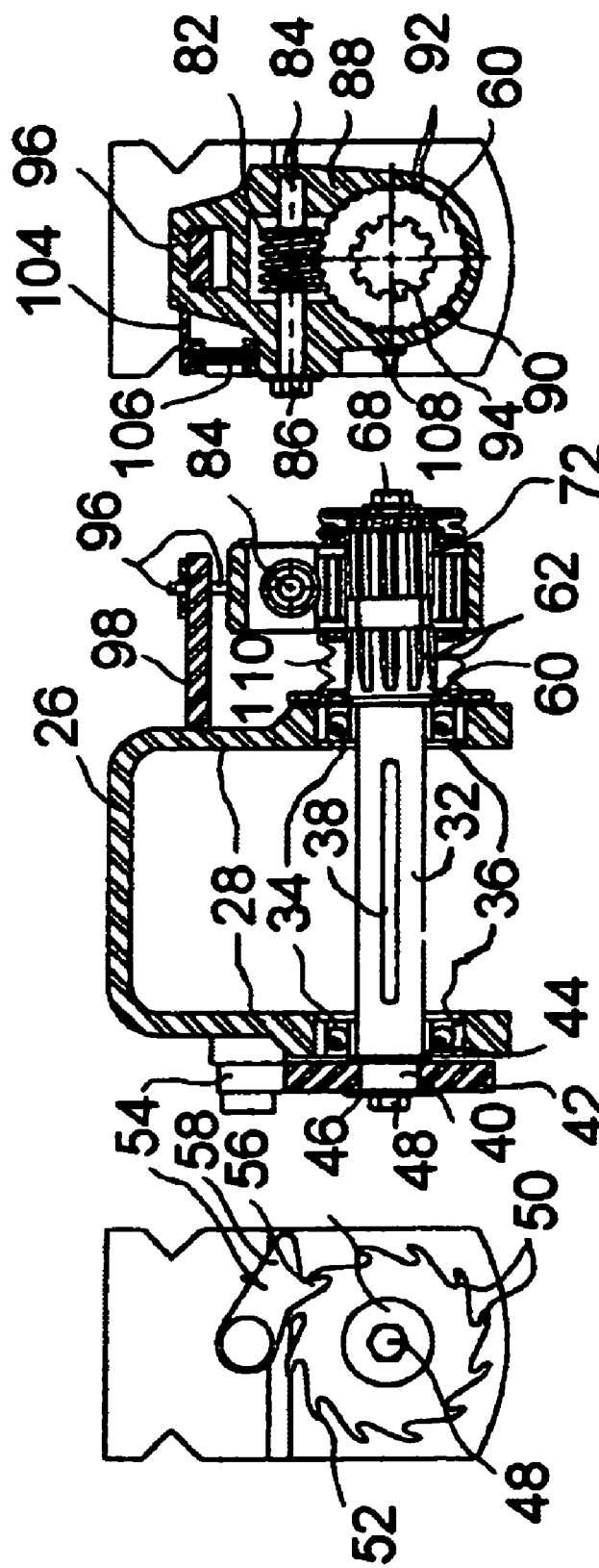

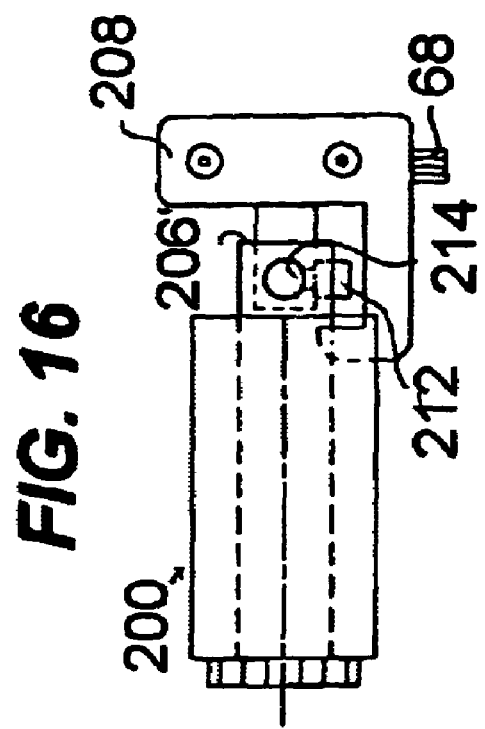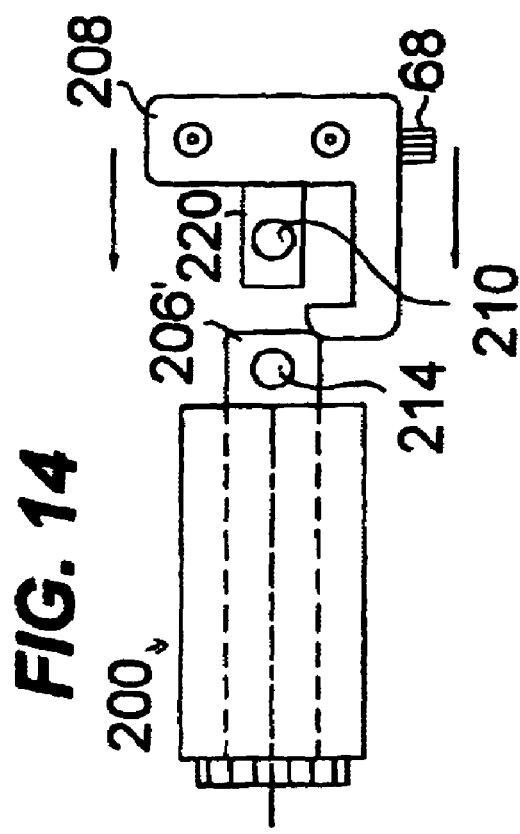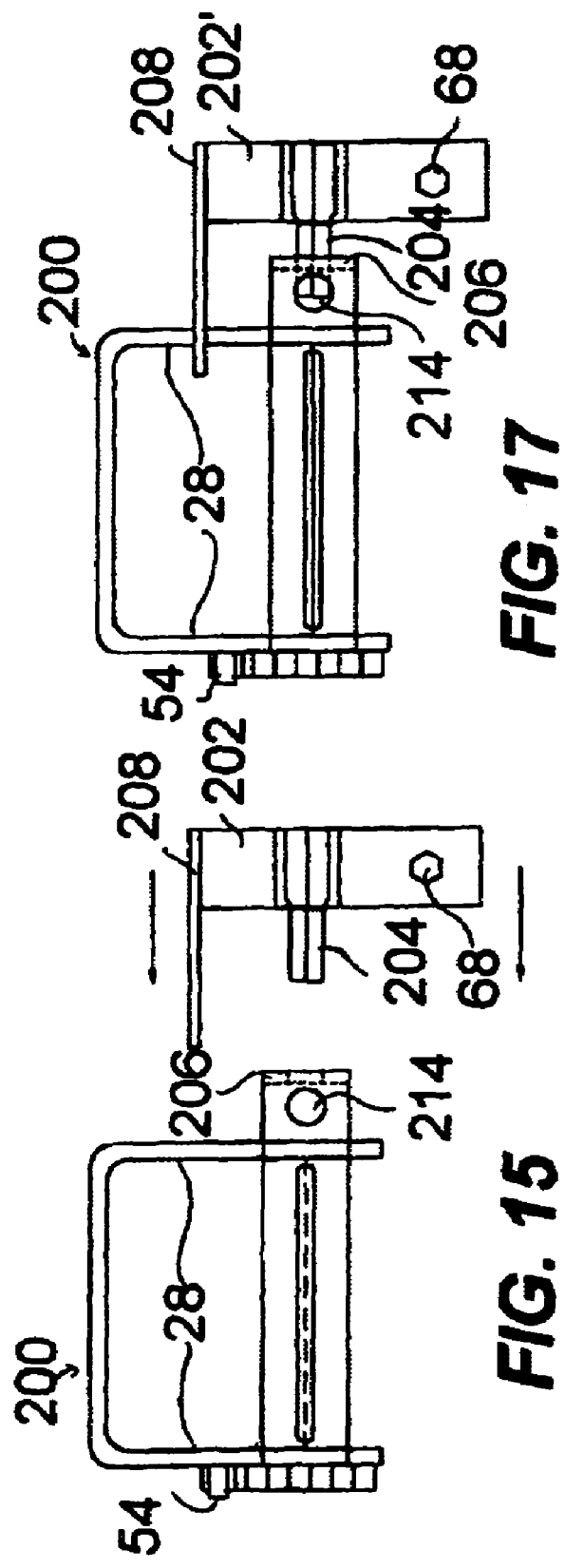

WINCH FOR CARGO TIE-DOWN STRAPS

This application claims priority based on provisional application 60/446,078 filed Feb. 10, 2003 for claims 1 and 2.

FIELD OF THE INVENTION

The present invention relates to the general field of vehicle accessories and is particularly concerned with a winch device for use with cargo tie-down straps.

BACKGROUND OF THE INVENTION

Open top compartments, such as truck trailers, dump trucks, storage bins and the like used for hauling or storing particulate material such as grain, ash, lime or the like are subject to having the materials fall or blow out onto the roadway. Similarly, relatively large loads of commodities such as lumber, plywood, building materials, building panels and the like on the beds of wheeled mobile carriers such as trucks, semi-trailers and full trailers are susceptible of dropping their loads onto the roadway with potentially disastrous consequences. With material such as gravel, aggregate or similar materials having portion of the load fall onto a roadway, is undesirable, both from the point of view of littering and the danger of material striking a following vehicle, possibly breaking a windshield or causing an accident.

Many localities now have laws requiring that all open top vehicle compartment be covered when containing loose or lightweight material. Often, the loads are simply covered with a tarpaulin that is tied to the edges of the open top at intervals around the opening. While sometimes effective, such tarpaulins are difficult for one person to put into place especially in windy conditions.

So called cargo tie-downs, also called hold downs or lashing straps, are commonly used in an attempt to control the hereinabove mentioned situations. These devices typically include a strap, bend or cord having a hook or loop at each end which enable the device to be connected to appropriate structures on a vehicle or trailer.

The strap, bend or cord is tensioned across the load to secure the load to the vehicle. Some of these devices have a generally resilient characteristic while other are substantially inelastic and include a ratchet, gear sets or buckle which allow the length of strap to be varied to secure the load on the vehicle.

Typically, the straps are drawn over the cargo, and each is applied to a winch mounted on the opposite side of the cargo bed. The winch can be turned in a direction to wind the strap tightly on the winch drum in order to tighten the winch straps on the cargo. A ratchet wheel and a pivotable pawl cooperate to lock the winch drum such that the straps are retained in a tight condition in which they are able to effectively restrain the cargo.

This type of restrain system used extensively throughout the transportation industry suffers from major drawbacks. The above described devices, such as the ratchet tie-down device, typically only uses a single ratchet, gear set or buckle to vary the length of the strap. While the single ratchet, gear set or buckle can be effective for securing some loads on vehicles, in some situations it can be desirable to have additional tension on the load which cannot be achieved using these devices. This is in part due to the known devices not providing a mechanical advantage to the strap, when tightened.

The single buckle, gear set or ratchet only have a single block for the strap between the end hooks and otherwise does not increase the user's mechanical advantage during the tie-down process. Moreover, some of these devices, and in particular the ratchet-type device, actually have a decreasing mechanical advantage as the device is being tightened which makes it even more difficult to tighten the device as the strap is pulled. That is why a rod is often used to act as a lever that a user forcibly pushes downward to tighten the strap and then ratchets up for another push downwards. If the gear set should break while the used pushes the lever downwards, he could seriously injure his knees or if there is a release of the pawl it could recoil the lever upwards thus potentially causing injury to the upper body of the user such as the face. Furthermore, because of the strength require to properly tighten a load, there is an increased risk of repetitive stress injury to the back and shoulders.

Another disadvantage associated with prior art devices relates to the fact that no provision has previously been made to disengage the pinion gear from the drum gear. In other words the gears are permanently meshed. As a consequence, when an operator pays out line, that is unwind the lines from the drum by pulling the line, the drum turns and drives the pinion gear which in turns spins the handle. If the line is quickly payed out, the handle spins both rapidly and forcibly, which is another potential cause of injury.

Another main drawback associated with most conventional winch for cargo tie-down straps, relates to the fact that they are both non ergonomical and tedious to operate. Furthermore, they are often mechanically complex and thus susceptible to break down in the sometimes harsh transportation environments.

Accordingly, there exists a need for an improved winch for cargo tie-down straps.

SUMMARY OF THE INVENTION

Advantages of the present invention include that the proposed winch for cargo tie-down straps is specifically designed to allow ergonomical handling thereof without requiring special tooling or manual dexterity. The proposed winch for cargo tie-down straps is specifically designed to allow an operator to pay out line, that is unwind the line from the drum by pulling the line, with ease. Also, the proposed winch for cargo tie-down straps increases the overall safety of the device by providing both a neutral position and an engaged position wherein the stress resulting from tightening of the straps is distributed to a pair of restraining structures instead of having the stress directed to a single restraining structure.

Still further, the proposed winch for cargo tie-down straps is specifically designed so as to be able to withstand harsh exterior environment and to maintain its functionality without requiring excessive maintenance.

Additionally, in order to offer most of these advantages to the large base of existing of cargo tie downs, a second embodiment of the invention shows an adaptor which can be temporarily mechanically connected to a standard cargo tie down.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1: is a partial side elevational view with sections taken out, showing a section of a trailer loaded, the load being secured by conventional tie-down straps.

FIG. 2: is a rear elevational view of the trailer, cargo, tie-down straps and associated winch for cargo tie-down straps.

FIG. 3: is a detailed view of FIG. 1 showing a winch for cargo tie-down straps.

FIG. 4: is a top view of the winch for cargo tie-down straps.

FIG. 5: is a rear view of the winch for cargo tie-down straps.

FIG. 6: is a side view of the winch for cargo tie-down straps.

FIG. 7: is a front view of the winch for cargo tie-down straps.

FIG. 8: is a top view of the winch for cargo tie-down straps with its gear mechanism in a neutral configuration.

FIG. 9: is a rear view of the winch for cargo tie-down straps with its gear mechanism in a neutral configuration.

FIG. 10: is a longitudinal cross sectional view of the winch for cargo tie-down straps with its gears in the neutral configuration.

FIG. 11: is a transversal cross sectional view of the internal components of the winch for cargo tie-down straps.

FIG. 14: is a top view of a standard winch with the independent tightening module at its side.

FIG. 15: is a longitudinal view of a standard winch with the independent tightening module at its side.

FIG. 16: is a top view of a standard winch with the independent tightening module engaged.

FIG. 17: is a longitudinal view of a standard winch with the independent tightening module engaged.

DETAILED DESCRIPTION

Figure 13:
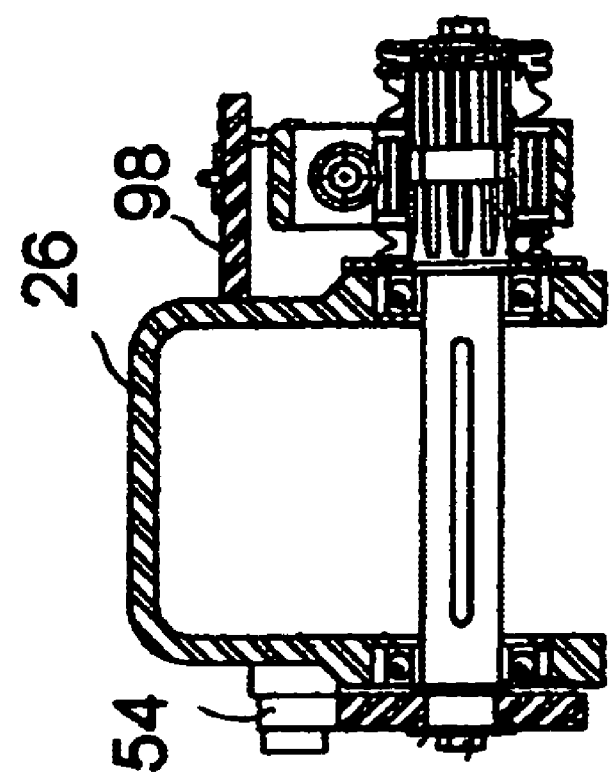
FIG. 13: is a longitudinal cross sectional view of the winch for cargo tie-down straps with its gears in the engaged configuration.

Referring to FIG. 1, there is shown a set of winches (10) for cargo tie-down straps in accordance with an embodiment of the present invention. Each winch (10) is shown attached to the frame of a trailer bed (12), mounted on wheels (14). The trailer (12) is shown carrying a load (16) secured thereunto by conventional tie-down straps (18). It should be understood that other types of vehicles and loads as well as other types of flexible members such as ropes, cables and the like could be used without departing from the scope of the present invention.

As shown in FIG. 2, each tie-down strap (18) has a distal end (20) thereof, hooked or otherwise fixed in a secure manner to the side of the trailer (12), opposite a corresponding winch (10). The tie-down straps (18) are drawn over the top of the cargo (16) and each strap is received at its proximal end (22) by a corresponding winch (10). The winch (10) is adapted to be used for tightening the tie-down straps (18), as is well known in the art.

Referring now more specifically to FIGS. 4–7, there is shown in greater details some of the external components of the winch (10). Each winch (10) has a rigid frame (24) defining a generally inverted "U" shaped configuration. Each frame (24) defines a frame securing segment (26) and a pair of integrally and substantially perpendicularly extending flanges (28). The frame mounting segment (26) is adapted to be connected to the trailer (12) in a suitable manner. The connecting section (26) may be bolted or welded to the underside of the bed (30).

Alternatively, the frame (24) may be fitted into a track (not shown) which allows each winch (10) to be adjusted in position forwardly and rearwardly along the trailer (12). The winch (10) includes a substantially cylindrical winch drum (32) extending between the flanges (28). As shown in FIG. 10, the winch drum (32) is rotatably mounted to the flanges (28), preferably using roller bearing assemblies (34), fittingly inserted within corresponding bearing assembly recesses (36), formed in the flanges (28) adjacent their distal ends.

At least one and preferably two drum slots (38) are formed in the winch drum (32) so that the free or proximal end (22) of the tie-town straps (18) can be threaded through the slots (38), thus securing the end of the strap (18) so that the strap (18) can be wound onto the drum (32) when the latter is rotated.

The winch drum (32) extends longitudinally at a first longitudinal end thereof into a ratchet mounting segment (40). A ratchet wheel (42) is mounted on the ratchet mounting segment (40) adjacent the outer surface of one of the flanges (28). A washer-type component (44) is preferably positioned intermediate the inner surface of the ratchet wheel (42) and the outer surface of the adjacent flange (28) to reduce friction therebetween.

The ratchet wheel (42) is preferably secured to the ratchet mounting segment (40) using both a securing ring (46) and a bolt type component (48). The ratchet wheel (42) is larger in diameter than the winch drum (32) and is located adjacent to the outer surface of one of the flanges (28). The ratchet wheel (42) thus prevents the winch drum (32), to which it is attached, from moving axially relative to the frame (24) although it can rotate as previously described.

The ratchet wheel (42) includes on its peripheral surface a set of teeth (50). Each teeth (50) has an inclined edge terminating at a tip (52) of the tooth (50).

A pawl (54) is pivotally secured to the outer surface of the flange (28) for interaction with the ratchet wheel (42). The pawl (54) has a pawl teeth (56) located so as to be able to interlock with the teeth (52) of the ratchet wheel (42), as is well known in the art. A pawl handle segment (58) is also defined for allowing an intended user to readily pivot the pawl (54) between operative and inoperative configurations, as is well known in the art.

The longitudinal end of the winch drum (32), positioned opposite the ratchet receiving segment (40), is provided with a gear cylinder (60) having gear teeth (62) extending radially therefrom. The gear cylinder (60) is secured by a bolt (68).

A worm drive (82) mounted on an axle (84) having an axle head (86) is rotatably mounted within a worm gear frame (88). The worm drive (82) cooperates with a worm gear (92) and has an inner set of teeth (94) which are configured and sized so as to selectively engage the gear cylinder (60) when the winch (10) is in its engaged configuration, shown in FIGS. 12, 13, or the free gear (72) when the winch (10) is in its neutral configuration, shown in FIGS. 8–11.

The worm gear frame (88) defines a hooking segment (96) for slidably hooking the worm gear frame (88) to a supporting segment (98) standing rearwardly from the adjacent flange (28). The supporting segment (98) is provided with notches (100, 102) for receiving a locking tongue (104) wherein thus releasably locking the worm gear frame (88) respectively either in the engaged and neutral configurations.

Conventional means are used for ensuring that the gear systems remain lubricated and protected from environmental elements such as dust, granular particles and the like. A greasing or lubricating nozzle (108) allows for the introduction of conventional lubricating components such as grease, oil or the like within the internal components located within the worm gear frame (88) while flexible resilient protective jackets (110) located on each side of the worm gear frame (88) prevent the introduction of granular particles while allowing movement of the worm gear frame (88) between its engaged and neutral configurations. The casings (110) are preferably of the accordion-type as shown in FIGS. 8, 10, 12 and 13.

In use, when the winch (10) is in its neutral configuration, shown in FIGS. 8–11, the winch drum (32) may be freely rotated using the head of the bolt (68) allowing manual tensioning of the tie-down strap (18) with the help of a wrench, key or ratchet set. Once the tie-down strap (18) is sufficiently manually tightened, the winch drum (32) may be locked using the pawl (54) in conjunction with the ratchet wheel (42).

Figure 12:
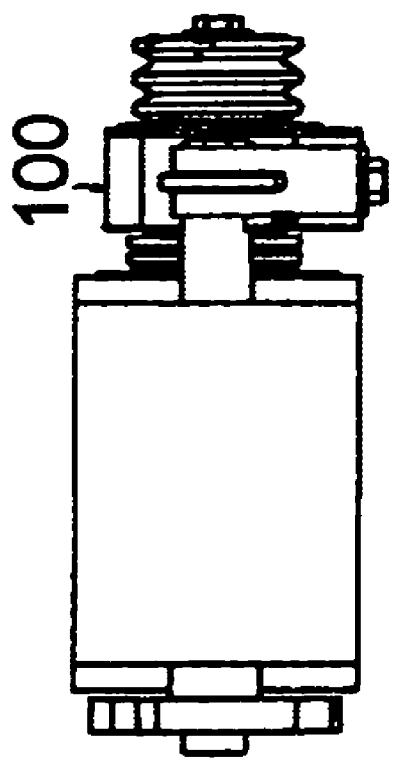
FIG. 12: is a top view of the winch for cargo tie-down straps with its gear mechanism in an engaged configuration.
Figure 18:
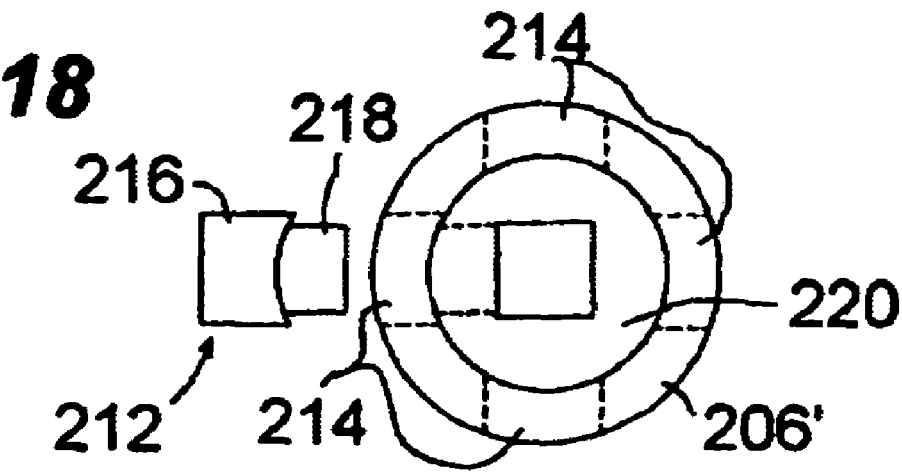
FIG. 18: side view of the circular lock, the circular key stem adaptor and the pin.
Figure 19:
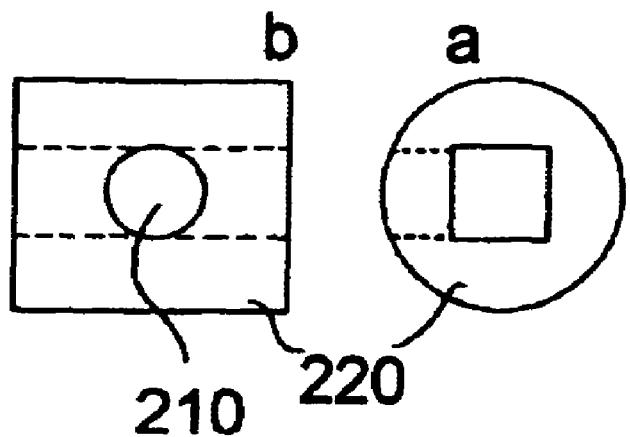
FIG. 19ab: side and longitudinal view respectively of the circualr key stem adaptor.
Figure 20:
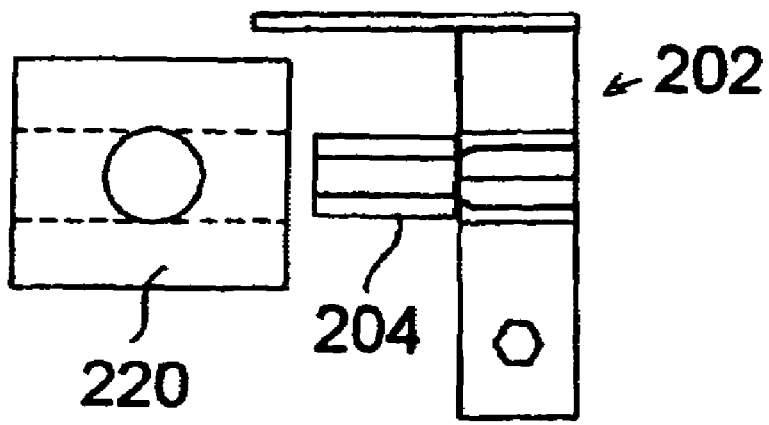
FIG. 20: side view of the circular key stem adaptor about to be fitted over the polygonal key stem.
Figure 23:
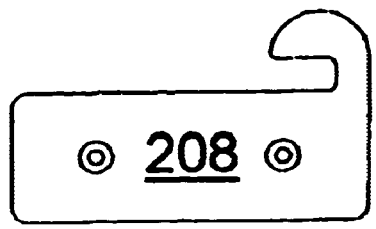
FIG. 23 is a top view of the "J" lock.
Figure 22:
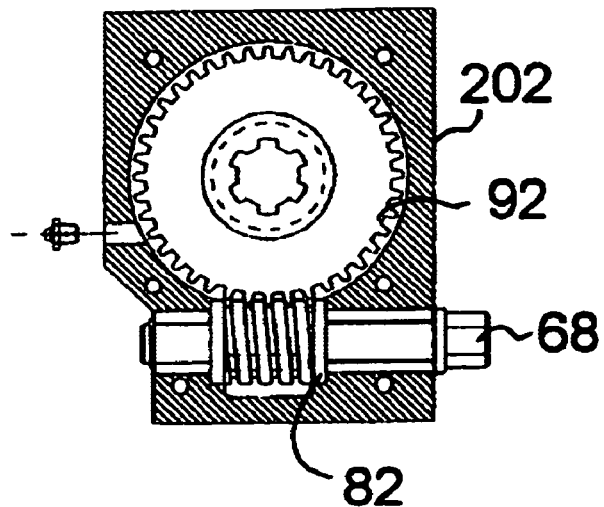
FIG. 22: is a cross sectional side view of the independent tightening module showing the worm drive and worm gear.
Figure 21:
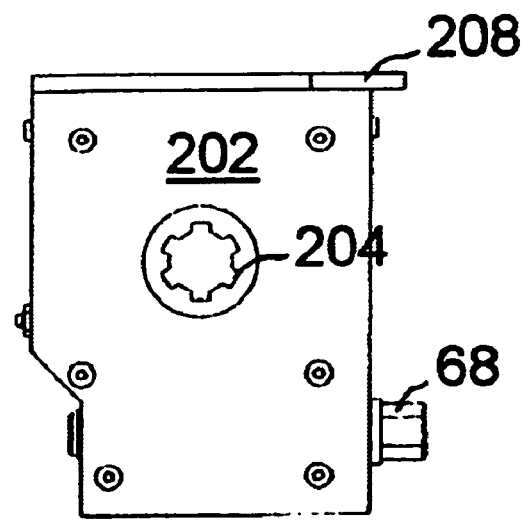
FIG. 21: is a side view of the independent tightening module showing the key stem.

The tongue (104) may then be pivoted about its pivoting axis (112) by depressing a trigger section (114) thereof to allow lateral movement of the worm gear frame (88) towards the engaged configuration, shown in FIGS. 12, 13, wherein the teeth (62) engage the inner set of teeth (94) of a driving disc (90). The bolt (68) is then used to drive the worm gear (92), hence further tensioning the tie-down strap (18). In order to release the tension in the tie-down straps (18), The pawl (54) is first lifted and the tongue (104) is released for allowing the worm gear frame (88) to be laterally displaced back to its neutral configuration, shown in FIGS. 8–11.

In order to leverage the vast installed base of standard winches (200) already in use, a variation of the winch (10) consists in separating the frame (24) part of the winch (10) from the part to the right of the flange (28) as per FIGS. 4–7 Using essentially the same mechanism already described but using it on a standard winch (200) as per FIGS. 14–17 allows for a more economical system which does not require to retrofit the entire fleet of trucks already equipped with the standard winches (200).

This independent tightening module (202) is easily insertable into an existing winch (200) using any of two possibilities which are:

1) FIGS. 15 and 17 Having a polygonal key stem (204) configured and sized to interface with a polygonal lock (206) welded onto a standard winch (200). This requires that such a polygonal lock (206) be welded, doing so does not impede traditional tightening in any way. By being polygonal, it will be easy to understand from the upcoming information, how the independent tightening module (202) would be able to tighten the straps.

2) FIGS. 14, 16, 18, 19, 20 A circular key stem adaptor (220) configured and sized to fit over a polygonal key stem (204) and said circular key stem adaptor (220) configured and sized for a circular lock (206') as they currently are on existing winches (200). The circular key stem adaptor (208) has a key adaptor hole (210) through which is inserted a pin (212) passing through an existing lock hole (214). There are usually two pairs of such holes (214) on existing winches (200) through which is inserted a rod as per the prior art. The pin (212) can have a head (216) which is diametrically larger than its body (218) so that the smaller body (218) can fit through the circular key stem adaptor (208). Using the tightening module (202) with this configuration requires four steps: Insertion of the circular key stem adaptor (208) over the polygonal key stem (204), insertion of the circular key stem adaptor (208) into a circular lock (206'), alignment of the holes (214) with a key adaptor hole (210), insertion of the pin (212).

Both configurations have the following method of use: The top of the tightening module (202) has a "J" lock (208) which engages the flange (28) of the standard winch (200). Full engagement of the "J" lock (208) occurs when one begins to turn the bolt (68), doing so biases the "J" lock (208) against the flange (28). Afterwards, continuing the turning of the bolt (68) results in the tightening of the strap (18). After one strap (18) is taut, the pawl (54) keeps it taut. When using the tightening module (202), it is released from the winch (200) by turning the bolt (68) in the opposite direction and turning the tightening module (202) slightly counterclockwise to release the "J" lock (208) from the flange (28). The user can then repeat the process for each winch (200). Because the tightening module (202) is released from the winch (200), there is no need to shift from a neutral to an engaged position which makes the tightening module (202) mechanically much simpler than the winch (10) as can be seen on FIG. 19 where only the worm drive (82) and the worm gear (92) are needed with the bolt (68).

The invention claimed is:

1. A winch for cargo tie-down straps to tie down straps comprising:
   a winch frame having a frame securing segment and a pair of integrally extending flanges;
   a winch drum rotatably mounted between said flanges;
   a pawl and ratchet mechanism attached at a longitudinal end of said winch frame;
   a fixed gear extending from an opposed longitudinal end of said winch drum;
   a free gear extending axially from said fixed gear;
   a worm gear mounted within a worm gear frame for driving a driving disc, said driving disc being adapted to selectively engage said fixed and free gears, depending on the positioning of said worm gear frame relative to a worm gear frame mounting assembly extending from said winch frame.

2. An independent tightening module to operate on a standard winch comprising:
   a worm drive cooperating with a worm gear, and a bolt actuating said worm drive;

a key stem configured and sized to interface with a lock found on a standard winch;

a "J" lock on said tightening module to engage a flange of said standard winch;

said key stem is configured polygonally and sized to interface with a polygonal lock welded onto a standard winch;

a circular key stem adapter configured and sized to fit over said polygonal key stem and said circular key stem adaptor configured and sized for a circular lock;

said circular key stem adaptor having a key adaptor hole through which is inserted a pin passing through an existing lock hole.

3. An independent tightening module to operate on a standard winch as in claim 2 wherein:

said pin having a head and a body and said head being diametrically larger than said body so that said smaller body can fit through said circular key stem adaptor.

4. An independent tightening module to operate on a standard winch as in claim 2 having the following method of use:

Inserting said circular key stem adaptor over said polygonal key stem;

inserting said circular key stem adaptor into said circular lock;

aligning said holes with a key adaptor hole;

Inserting said pin into said key adaptor hole.

* * * * *